Patented Sept. 19, 1922.

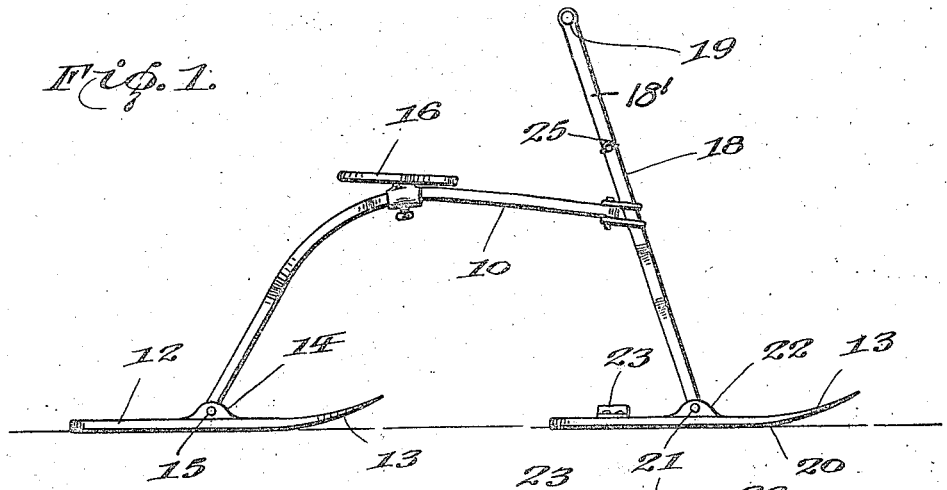
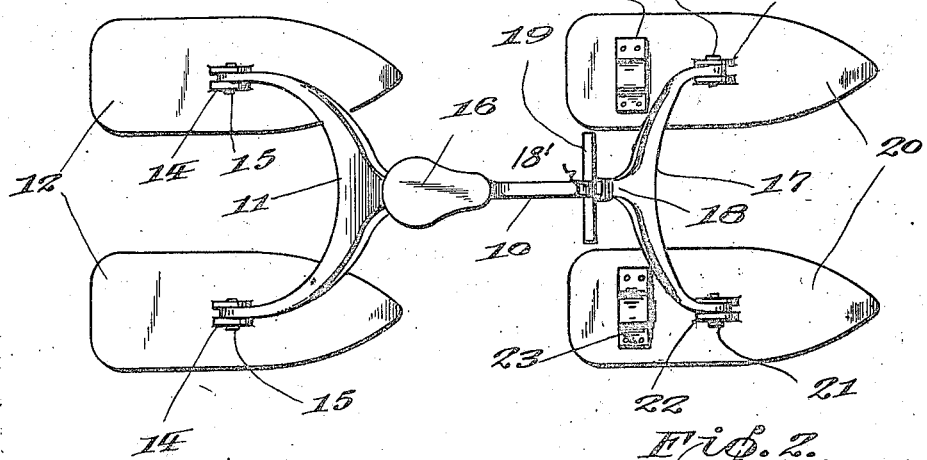
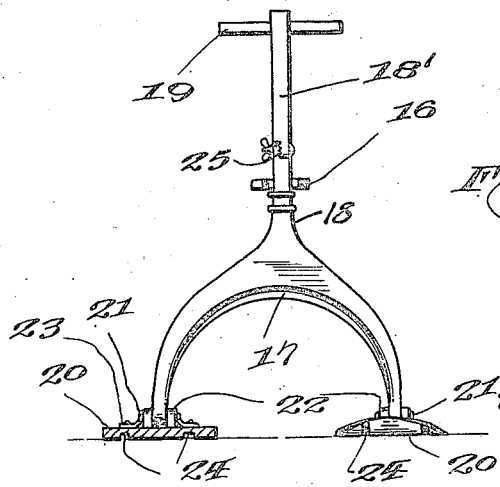

1,429,636

UNITED STATES PATENT OFFICE.

ERNEST N. ROWE, OF GLENWOOD SPRINGS, COLORADO, ASSIGNOR OF ONE-HALF TO HARRY McMILLEN, OF GLENWOOD SPRINGS, COLORADO.

SNOW VEHICLE.

Application filed May 13, 1921, Serial No. 469,333. Renewed April 21, 1922. Serial No. 555,917.

*To all whom it may concern:*

Be it known that I, ERNEST N. ROWE, a citizen of the United States, residing at Glenwood Springs, in the county of Garfield, State of Colorado, have invented certain new and useful Improvements in Snow Vehicles; and I do hereby declare the following to be a full, clear, and exact description of the invention, such as will enable others skilled in the art to which it appertains to make and use the same.

This invention relates to new and useful improvements in vehicles and particularly to vehicles for children for use on snow or ice.

One object of the invention is to provide a device of this character which is built, in its general outline, similar to a bicycle, but which has runners instead of wheels.

Another object is to provide a device of this character on which the user can be seated, and on which the person can coast down snow covered inclines.

Another object is to provide a device of this character wherein the rider can use his feet on the front runners after the manner of the ordinary skees, to propel the vehicle on level or upwardly inclined places.

Other objects and advantages will be apparent from the following description when taken in connection with the accompanying drawing.

In the drawing:

Figure 1 is a side elevation of a snow vehicle made in accordance with the invention.

Figure 2 is a top plan view of the same.

Figure 3 is a front elevation of the device, one of the front skees being in section, to show the foot strap or loop carried by the rear end portion thereof.

Referring particularly to the accompanying drawing, 10 represents a longitudinally extending bar which has its rear end turned downwardly and forked, as shown at 11. Below each leg of the forked end of the bar 10 is disposed a runner or skee 12 formed from wood or thin metal and having its forward end tapered to a point and turned or curved upwardly, as shown at 13. On the upper face of each skee 12, and intermediate the length thereof, there are formed the longitudinally extending parallel apertured lugs 14, between which is disposed a leg of the fork 11, a pivot pin or bolt 15 being disposed through the lugs and leg whereby the skee is free to rock on the leg, as when passing over irregularities in the snow surface. On the upper side of the bar 10 is secured the saddle or seat 16, for the rider.

At a suitable distance forwardly of the fork 11 is disposed a second fork 17 having the upwardly extending stem or shank 18 and adjustably pivoted on the upper end of the stem 18 is a stem 18', which has the transverse handle bar 19 on its upper end. To the said shank 18, between the fork 17 and the bar 19, is pivotally connected the forward end of the bar 10, the bar 19 being so formed and located as to be in convenient reach of the rider from the saddle. The lower ends of the legs of the fork 17 are pivotally connected to the front skees 20, by means of the pins 21, disposed through the apertured lugs 22 and the ends of the said legs. On the rear end portions of the front skees 20 are disposed the transverse straps 23, beneath which the rider slips the toes of his shoes, his feet resting on the upper faces of the skees.

In the operation of the device, the rider simply seats himself on the saddle, engages his toes on the front skees, beneath the straps, and grasps the handle bar. In this position the rider can coast down a hill using his feet and hands to assist in steering the front portion of the vehicle. By reason of the fact that the skees are pivoted to the legs of the two forks, permits the skees to rock when passing over irregularities in the snow surface. When the rider reaches a level or upwardly inclined place, he may propel himself forwardly, without leaving the saddle, by advancing the front skees, in walking fashion, after the manner adopted with the ordinary skees, the forward fork rocking from side to side, during this manipulation of the skees. Each time that the rider moves one of the front skees forwardly, in advance of the other skee, he shifts his weight onto the advanced skee so that it will form a pivot on which the rear skee may be swung forwardly into a position in advance of the first one. Thus the action, which resembles waddling, serves to permit the rider to propel the vehicle forwardly on level ground or up an incline.

The bottom face of each skee is longitudinally grooved, as shown at 24, in Figure 3, so that the skees will not slide or skid, sidewise.

What is claimed is:

A snow vehicle comprising a pair of forks, one of the forks having a forwardly extending horizontal bar pivotally connected to the other fork, skees pivotally connected to the lower ends of the legs of the forks, a handle bar on the said other fork, and transverse straps on the rear portions of the front skees for engagement with the feet of the rider whereby the rider steers with the hands and feet.

In testimony whereof, I affix my signature, in the presence of two witnesses.

ERNEST N. ROWE.

Witnesses:
 KATHRYN GILMER,
 LAURA W. HAMMOND.